(12) United States Patent
Toeniskoetter (10) Patent No.: US 8,024,955 B2
(45) Date of Patent: Sep. 27, 2011

(54) PART IN DIE, DIE CHANGE PROCESS

(75) Inventor: James Toeniskoetter, Rochester Hills, MI (US)

(73) Assignee: Hirotec America, Inc., Auburn Hills, MI (US)

(*) Notice: Subject to any disclaimer, the term of this patent is extended or adjusted under 35 U.S.C. 154(b) by 553 days.

(21) Appl. No.: 12/271,061

(22) Filed: Nov. 14, 2008

(65) Prior Publication Data

US 2009/0126452 A1    May 21, 2009

Related U.S. Application Data

(60) Provisional application No. 61/003,807, filed on Nov. 20, 2007.

(51) Int. Cl.
*B21J 7/46* (2006.01)
(52) U.S. Cl. ............... 72/444; 72/446; 72/447; 72/448; 483/1; 483/29
(58) Field of Classification Search ............... 72/444, 72/446–448; 483/1, 28, 29
See application file for complete search history.

(56) References Cited

U.S. PATENT DOCUMENTS

| 5,466,207 A | * | 11/1995 | Arens | 483/28 |
| 5,582,062 A | * | 12/1996 | Sommer | 72/448 |
| 5,755,653 A | * | 5/1998 | Nishida | 483/1 |

* cited by examiner

*Primary Examiner* — Dana Ross
*Assistant Examiner* — Matthew G Katcoff
(74) *Attorney, Agent, or Firm* — Fildes & Outland, P.C.

(57) ABSTRACT

A die change method includes providing a press apparatus having a base and a ram, and a first die set including an upper die member and a lower die member. The lower die member is supported on the base and the upper die member is mounted on the ram. The ram is lowered into a closed, home position to mate the upper and lower die members and to perform an operation on a workpiece disposed between the die members. The ram is released from the upper die member. The ram is raised a minimum distance to provide minimal clearance for removing the upper and lower die members from the press. The mated upper and lower die members are moved out of the press with the workpiece held between the upper and lower die members.

11 Claims, 9 Drawing Sheets

PART IN DIE, DIE CHANGE PROCESS

CROSS REFERENCE TO RELATED APPLICATION

This application claims the priority of U.S. Provisional Application No. 61/003,807 filed Nov. 20, 2007.

TECHNICAL FIELD

This invention relates to press and die apparatuses, and more particularly to a die change method for a press and die apparatus.

BACKGROUND OF THE INVENTION

It is known in the art relating to flexible assembly systems to use a batch build method or a synchronous method. In a synchronous method, the batch size is one. Synchronous production methods typically use multiple presses without changing the die in any of the presses. Use of multiple presses requires a large amount of space and is associated with high machinery costs. On the other hand, batch production methods, such as in the production of vehicle closure panels, often use press and die hemming apparatuses with die changers. Conventional die change methods, however, are time-consuming and decrease production speed. For example, for automotive closure panel assembly lines, production speeds are typically in the range of 50 to 120 jobs per hour.

In conventional press applications, the home position of the press is an open position. The first step in the operational sequence is the part is loaded onto the lower die, and the press cycles to a closed position and returns to the open position to complete a work stroke. During the work stroke, the press performs work on a workpiece via a die held by the press. To change the die, a workpiece or part inside the die is first removed from the die and/or transferred to another station. Then the die is moved from the open home position to the closed position. The upper die is released and the press raises to the home position, leaving the upper die on the lower die. The die is then shuttled out of the press and a new die is shuttled into the press. The press then lowers to the closed position, and the upper die is clamped to the press. The press then raises back to the home position and is ready to perform work on a new workpiece.

SUMMARY OF THE INVENTION

The present invention provides a die change method for a press and die apparatus, such as a press and die hemmer, that is capable of die change and part run within line cycle time. The die change method may be used for automotive vehicle closure panel assembly production, other metal stamping applications, as well as any other press and die application, including plastic applications. The present invention is characterized by leaving a part in the die during the die change process.

More particularly, in a die change method according to the invention, a home position of a press is a lowered, closed position. In other words, in the home position the press is lowered and the die is closed. Typically, when the die is in the closed position, a finished workpiece, part, closure panel, or similar will be disposed in the die. From the closed home position, the press either will be directed to perform work on a new part or to go through a die change procedure. This decision is based upon the requirements of the production line.

If the press is directed to run a part, the press is moved to an open position, the finished part located in the die is unloaded, and a new part is loaded into the press for the next press operation. The press then closes, thereby performing work on the new part. In the closed position, the press is back in its home position and awaits the next process instruction.

In the case that the next instruction is to run a different workpiece (i.e., different type or model of workpiece), the press will begin the die change procedure as follows. From the closed home position, clamps or other mounting means that hold the upper die to the press are released. The press then raises only slightly to allow minimal clearance for changing the die. The die is then shuttled out of the press and a new die is shuttled into the press. The press then lowers to close the gap between the press and the die, and the upper die is secured to the press. The die change is complete, and the press may open, the finished part located in the die is unloaded, and a new workpiece may be placed in the lower die, and the press returns to the closed home position to perform work on the workpiece.

Therefore, in the present die change method, the press only has to cycle once to perform a single part run (i.e., work on one workpiece) and to perform a die change. In contrast, in conventional methods, a press has to cycle three times to run one workpiece and to perform a die change. The present die change method therefore significantly reduces the amount of time taken to perform a die change. The present die change method also allows for the production of parts in batches of one using different dies at a higher rate measured in jobs per hour than possible using conventional processes.

In an embodiment, a die change method in accordance with the present invention includes providing a press apparatus having a base and a ram, and a first die set including an upper die member and a lower die member. The lower die member is supported on the base and the upper die member is mounted on the ram. The ram is lowered into a closed, home position to mate the upper and lower die members and to perform an operation on a workpiece disposed between the die members. The ram is released from the upper die member. The ram is raised a minimum distance to provide minimal clearance for removing the upper and lower die members from the press. The minimal clearance may be generally 200 mm. The mated upper and lower die members are moved out of the press with the workpiece held between the upper and lower die members. One finished workpiece per die may be stored on a die changer.

The method may further include moving a second die set including an upper die member and a lower die member into the press such that the second lower die member is supported by the base. The ram is lowered into the closed, home position such that the ram contacts the second upper die member. The second upper die member is mounted on the ram.

The method may also include providing a die changer having a plurality of locations for storing die. The die changer is rotated such that an empty die storing location is aligned with the press. The first die set is moved out of the press and into the empty die storing location. The die changer is rotated such that a second die set located in one of the die storing locations is aligned with the press. The second die set is moved into the press. The die changer may be a rotary die changer. Each die set disposed in the die changer may store one finished workpiece.

The method may also included raising the ram from the closed, home position into an open position wherein the second upper die member is spaced from the second lower die member a distance greater than the minimum distance. Another workpiece is inserted into the press and is placed on the second lower die member. A finished workpiece is removed from the second upper die member. The ram is lowered into the closed, home position to mate the second upper and lower die members and to perform an operation on the another workpiece disposed between the die members. A robotic arm may manipulate workpieces into and out of the press. The workpiece may be a set of nested panels. The operation performed on the workpiece may be a hemming operation.

These and other features and advantages of the invention will be more fully understood from the following detailed description of the invention taken together with the accompanying drawings.

DETAILED DESCRIPTION OF THE INVENTION

Referring now to the drawings in detail, numeral 10 generally indicates a rotary die changer and die press system. The system 10 includes a die press 12 and a rotary die changer 34. A home position of the die press 12 is a closed position in which a die in the die press 12 is shut. During a die change process, a workpiece is left in a die that is removed from the die press 12.

Figure 1:
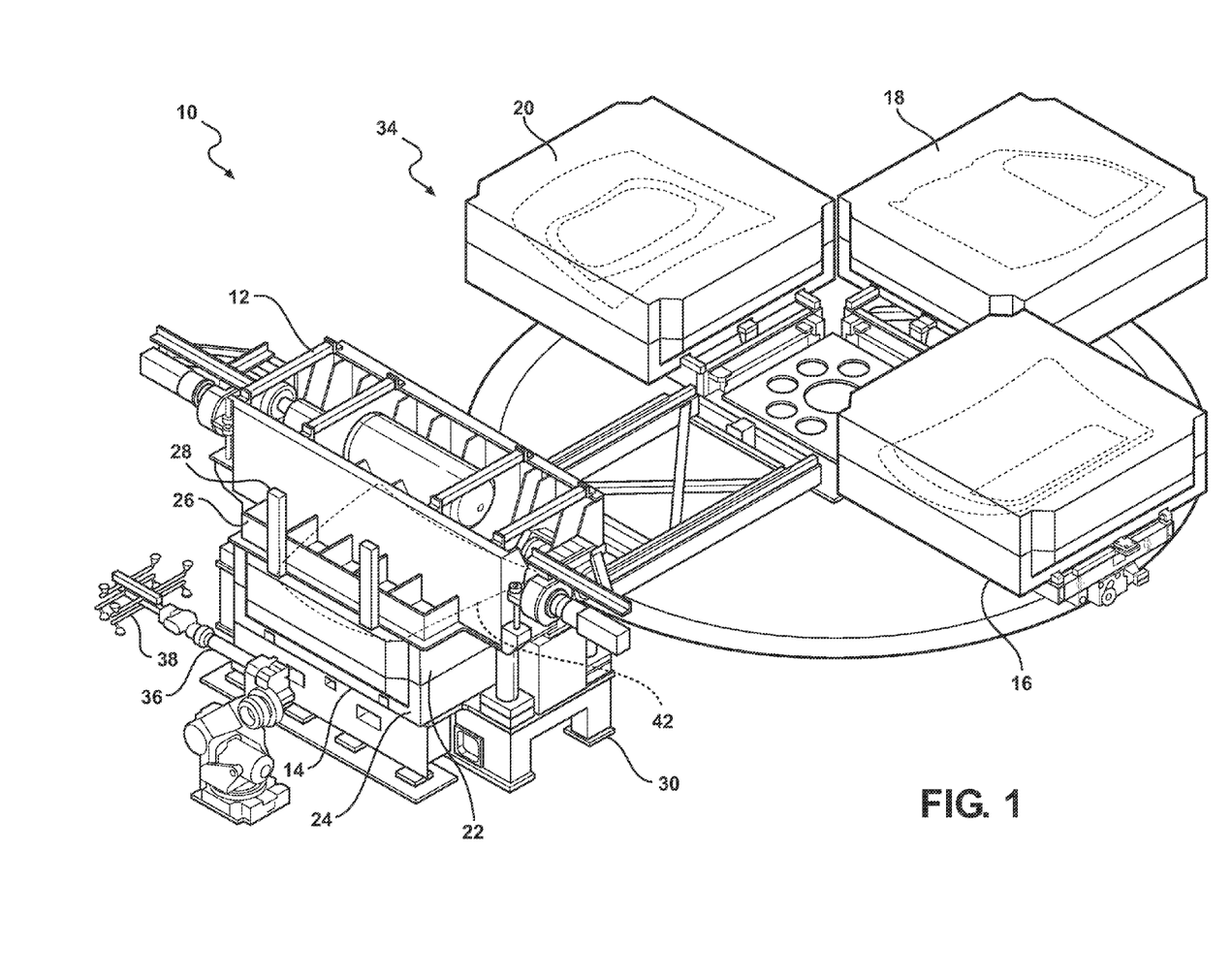
FIG. 1 is a schematic view illustrating a rotary die changer and a die press in accordance with the present invention wherein the die press is closed with a die in the press.

In a specific embodiment shown by example in the drawings, a method according to the invention may be applied to the rotary die changer and die press system 10. In FIG. 1, a first die set 14 is positioned in the die press 12. The first die set 14 includes upper and lower members 22, 24, respectively. The upper member 22 is mounted on a ram 26 of the die press 12, such as by clamps 28 or similar, and the lower member 24 rests on a base 30 of the die press 12. The die press 12 is in a closed, home position as shown wherein the ram 26 is lowered to mate the upper 22 and lower members 24 of the first die set 14. In the closed position, the die press 12 performs a press operation (e.g., hemming) on a part or workpiece, such as a vehicle closure panel or similar, that is loaded on the die, to generate a "finished" workpiece. The rotary die changer 34 stores second 16, third 18, and fourth 20 die sets while the first die set 14 is in use. The system also includes a robot 36 such as a multi-axis robotic arm or similar. The robot includes end-of-arm tooling 38 that allows the robot 36 to pick and move parts.

Figure 2:
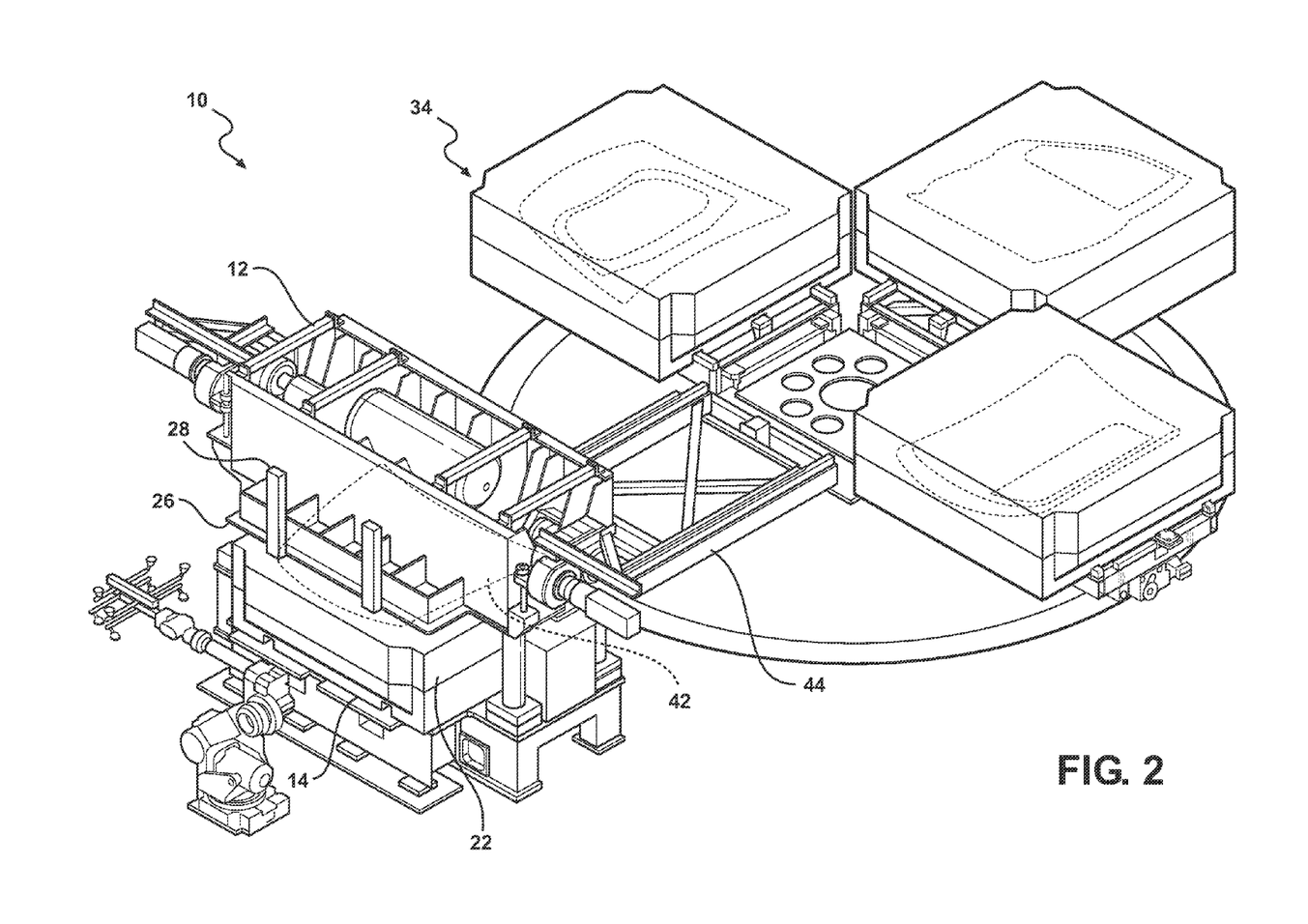
FIG. 2 is a schematic view illustrating the die press opened slightly with a hemmed part in the die.
Figure 3:
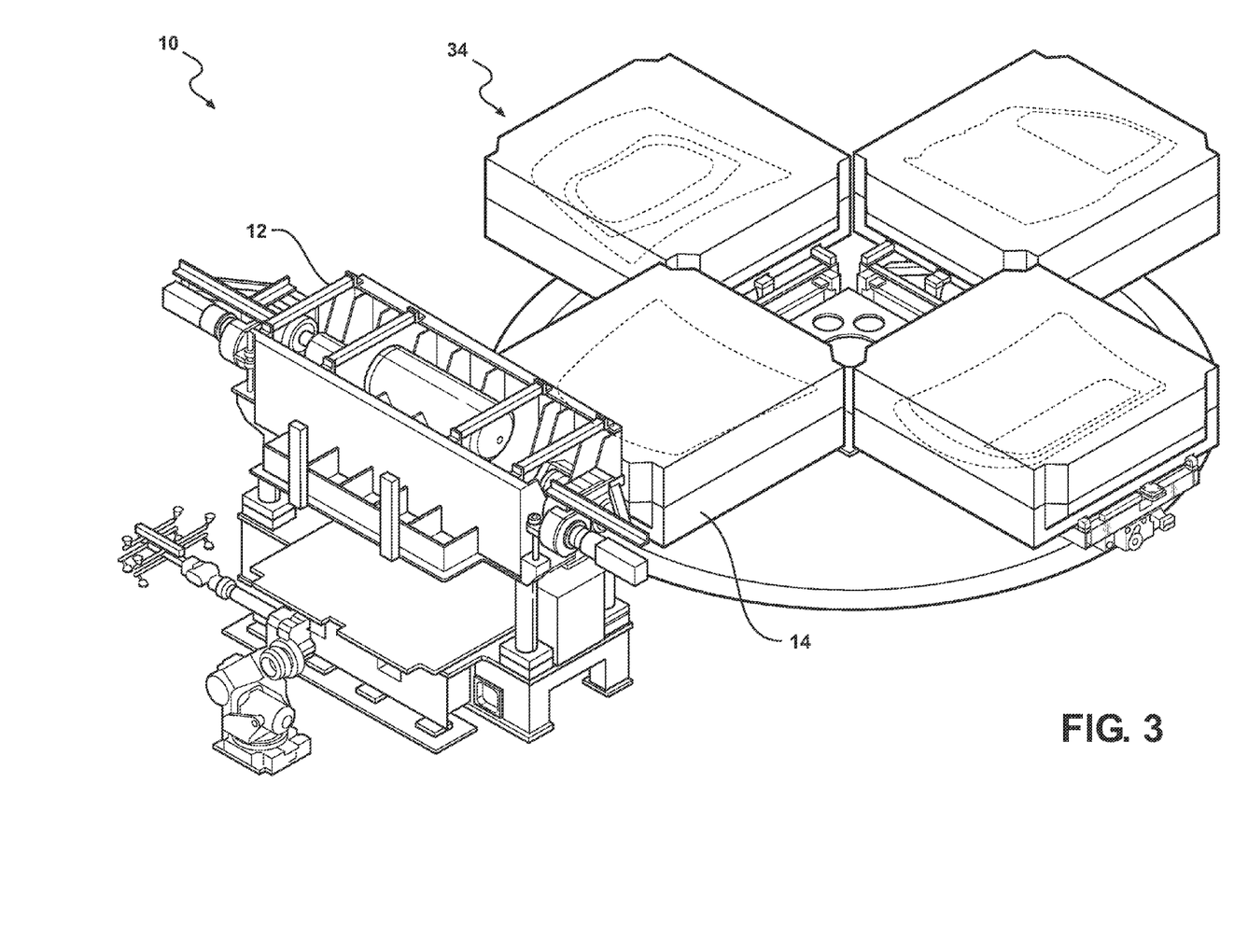
FIG. 3 is a schematic view illustrating the die fully out of the press and loaded on the die changer.

In FIG. 2, the system begins a die change operation. The clamps 28 holding the upper member 22 of the first die set 14 to the ram 26 are released, and the press opens slightly (i.e., only a minimum distance that provides clearance) to a die change position as shown. For example, the press may open a distance of approximately 200 mm. The hemmed part 42 in the first die set 14 remains in the first die set 14. The die changer begins to move the first die set 14 out of the die press 12 into an empty, available location 44 on the die changer 34. In FIG. 3, the first die set 14 is fully out of the die press 12 and loaded onto the die changer 34.

Figure 4:
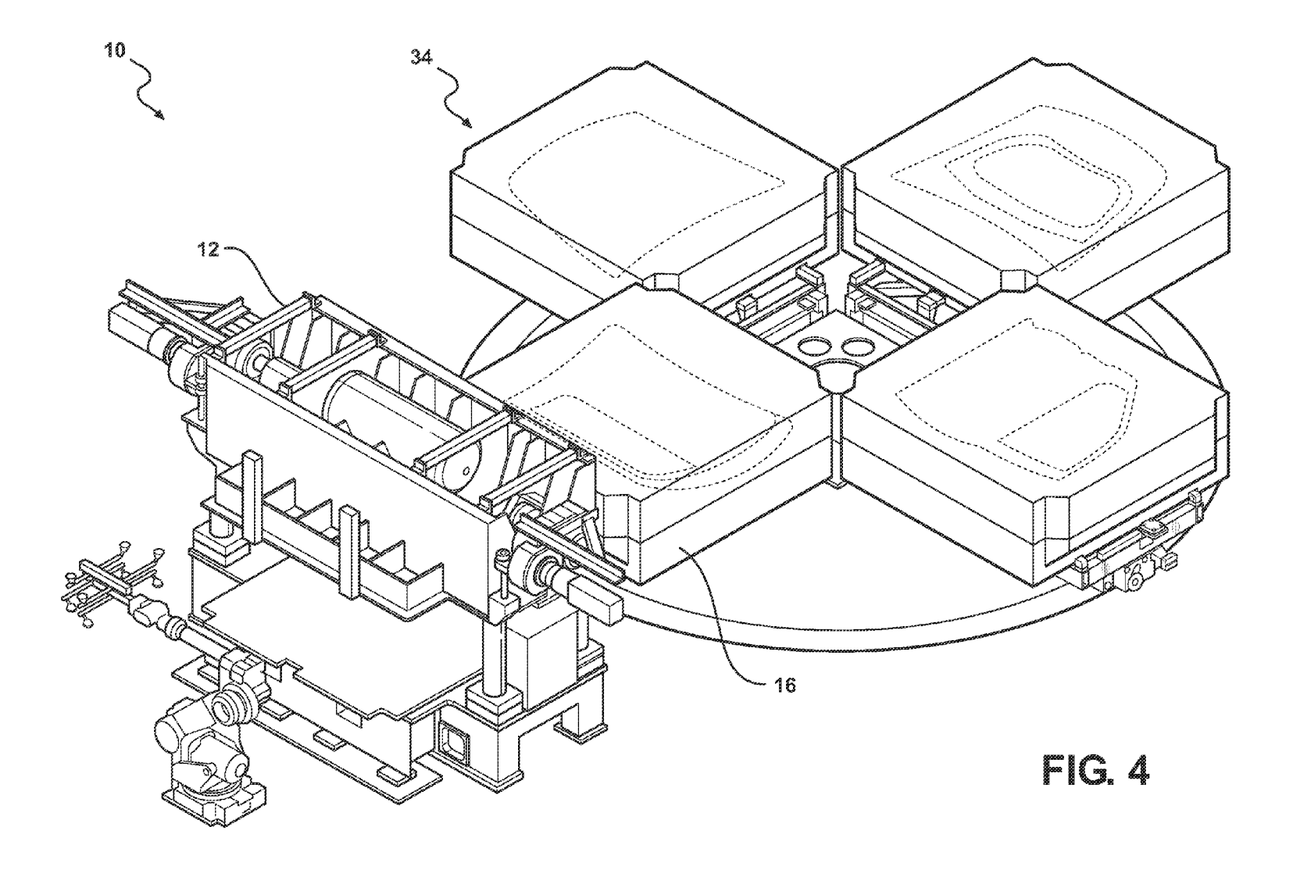
FIG. 4 is a schematic view illustrating the die changer rotated 90 degrees from its position shown in FIG. 4.

The die changer 34 then begins to rotate in order to bring another die set in alignment with the die press 12 for loading onto the die press 12. In FIG. 4, the die changer 34 has rotated 90 degrees from its disposition in FIG. 3. In this example, a 90 degree rotation of the die changer 34 aligns the second die set 16 with the die press 12. During the rotation of the die changer 34, the die press 12 remains in the slightly open, die change position that is first shown in FIG. 2.

Figure 5:
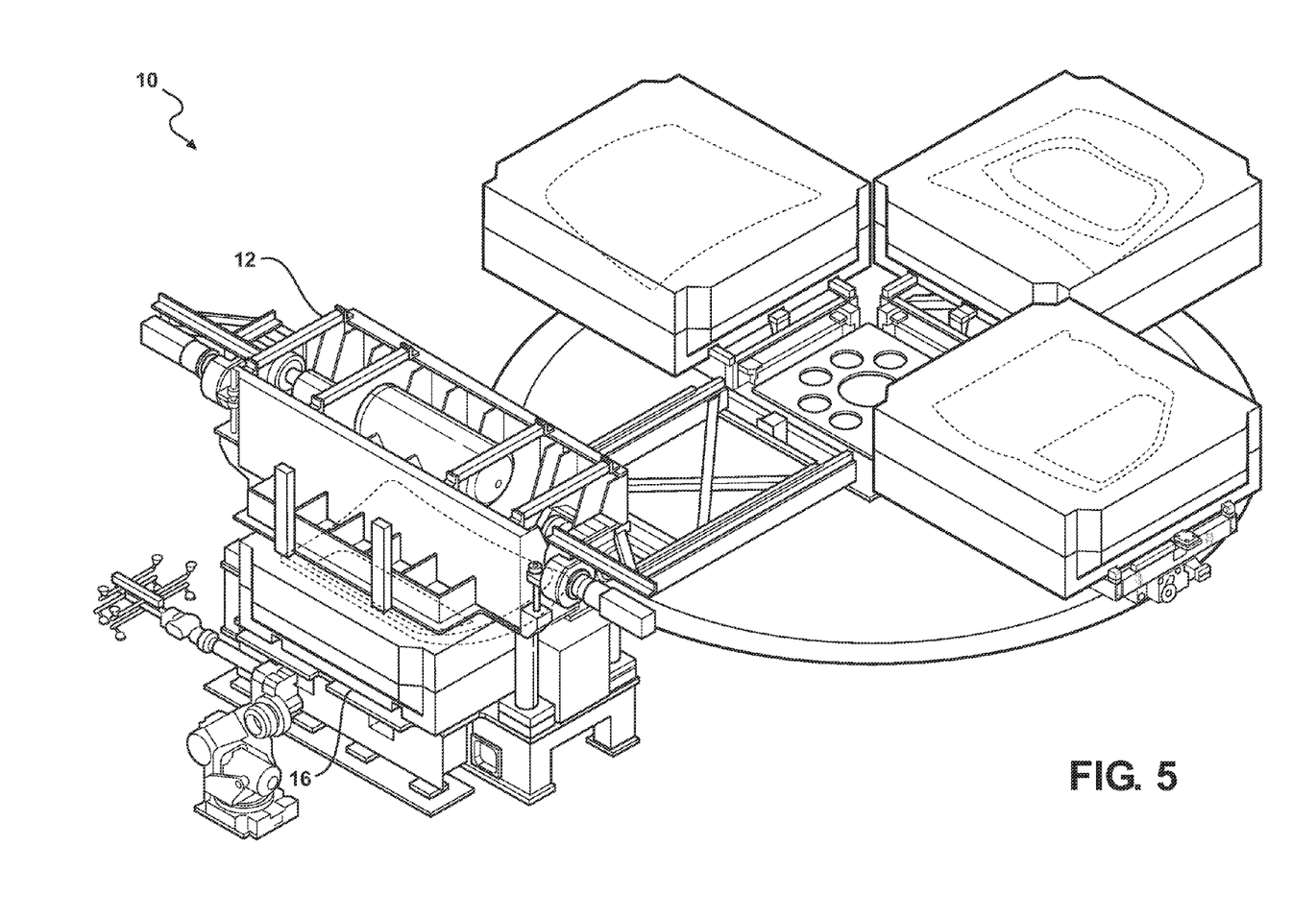
FIG. 5 is a schematic view illustrating the second die fully loaded into the press.
Figure 6:
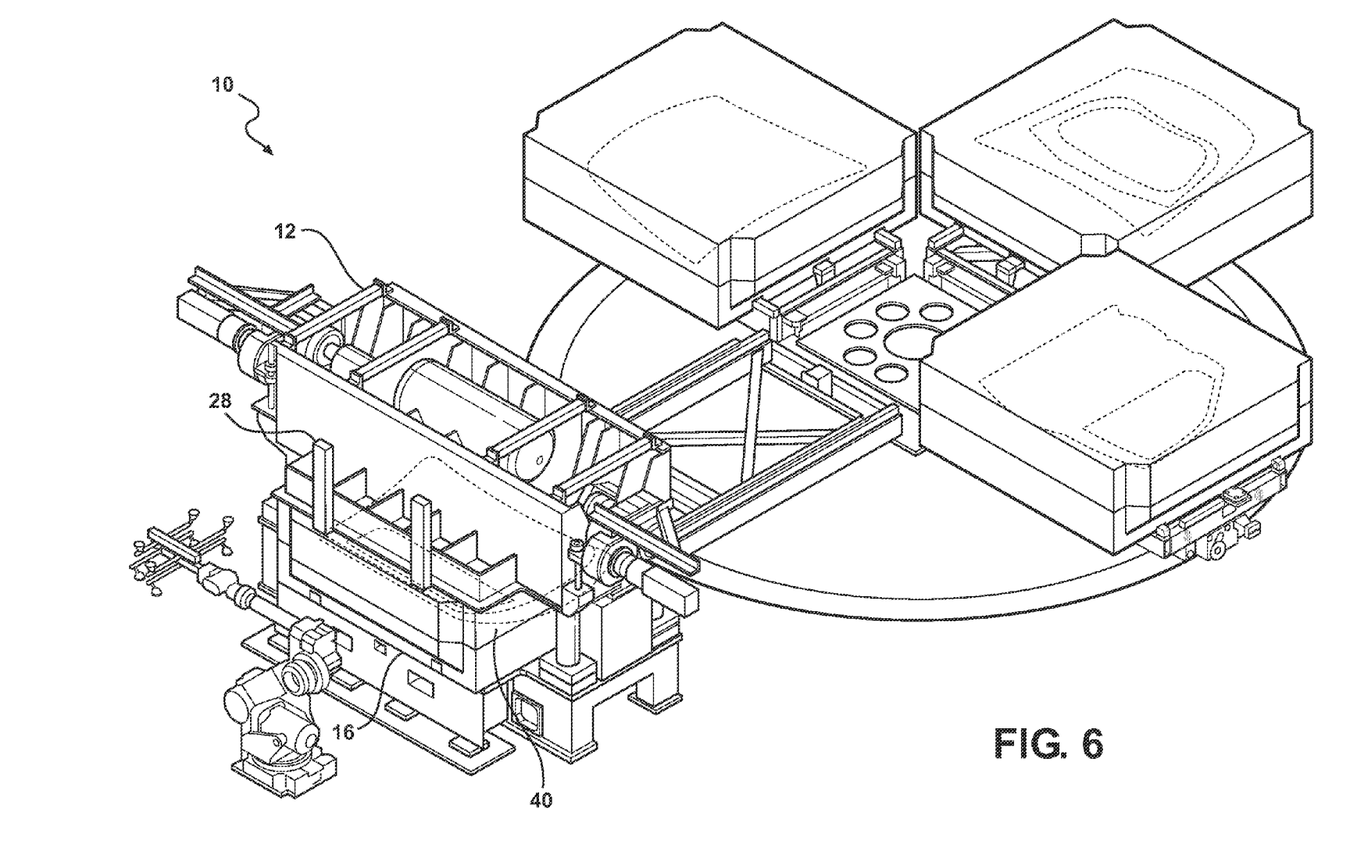
FIG. 6 is a schematic view illustrating the press in a fully closed position.

The second die set 16 is now aligned with the die press 12 and is ready to be loaded onto the die press 12. The second die set 16 is then moved from the die changer 34 to the die press 12. In FIG. 5, the second die set 16 is fully loaded onto the die press 12. Next, as shown in FIG. 6, the die press 12 moves to the closed home position, and the upper member 40 of the second die set 16 is securely mounted on die press 12 by the clamps 28.

Figure 7:
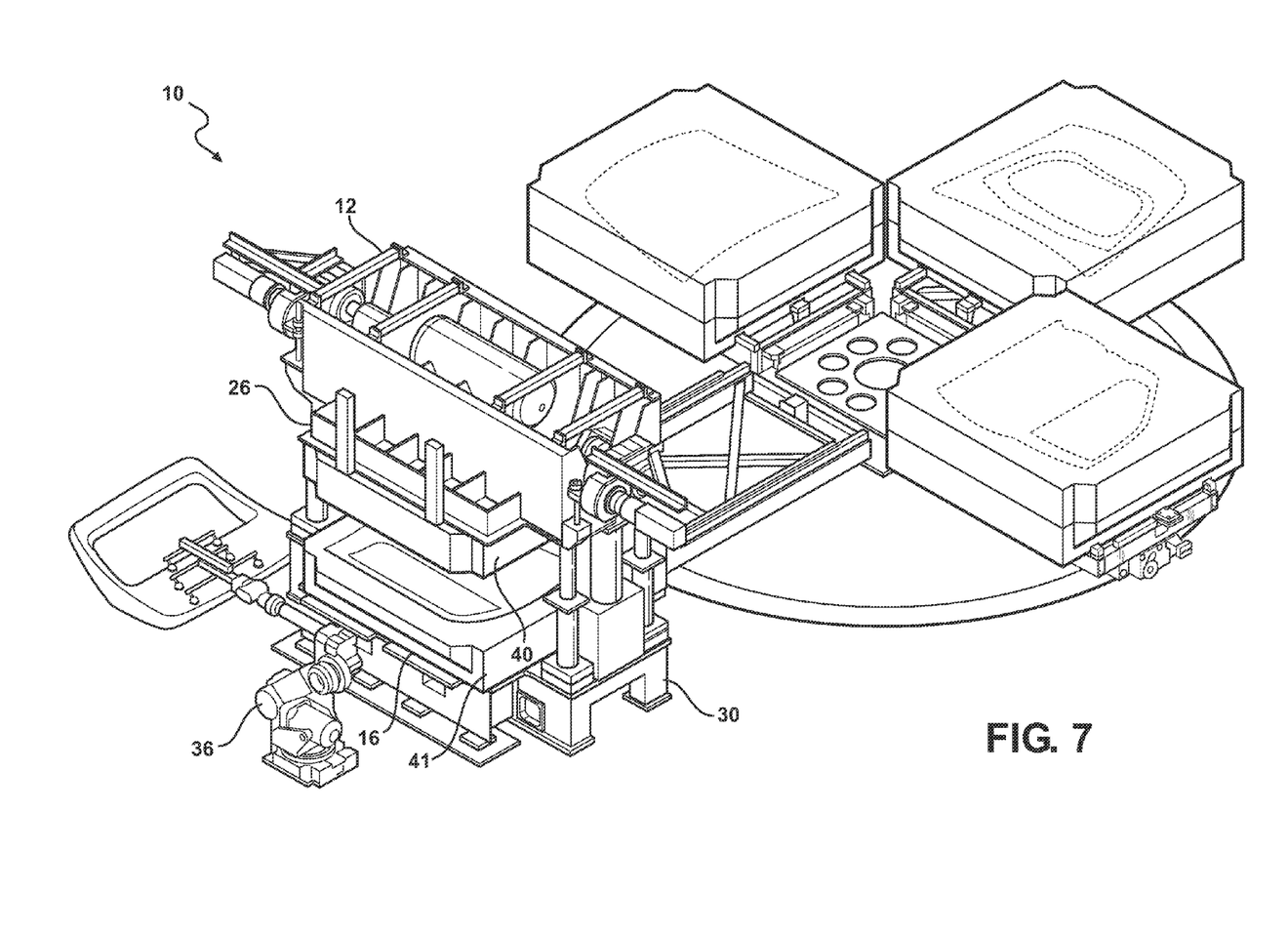
FIG. 7 is a schematic view illustrating the press in an open position wherein an upper member of the second die is in a ram of the press and a lower member of the second die rests in a base of the press.
Figure 8:
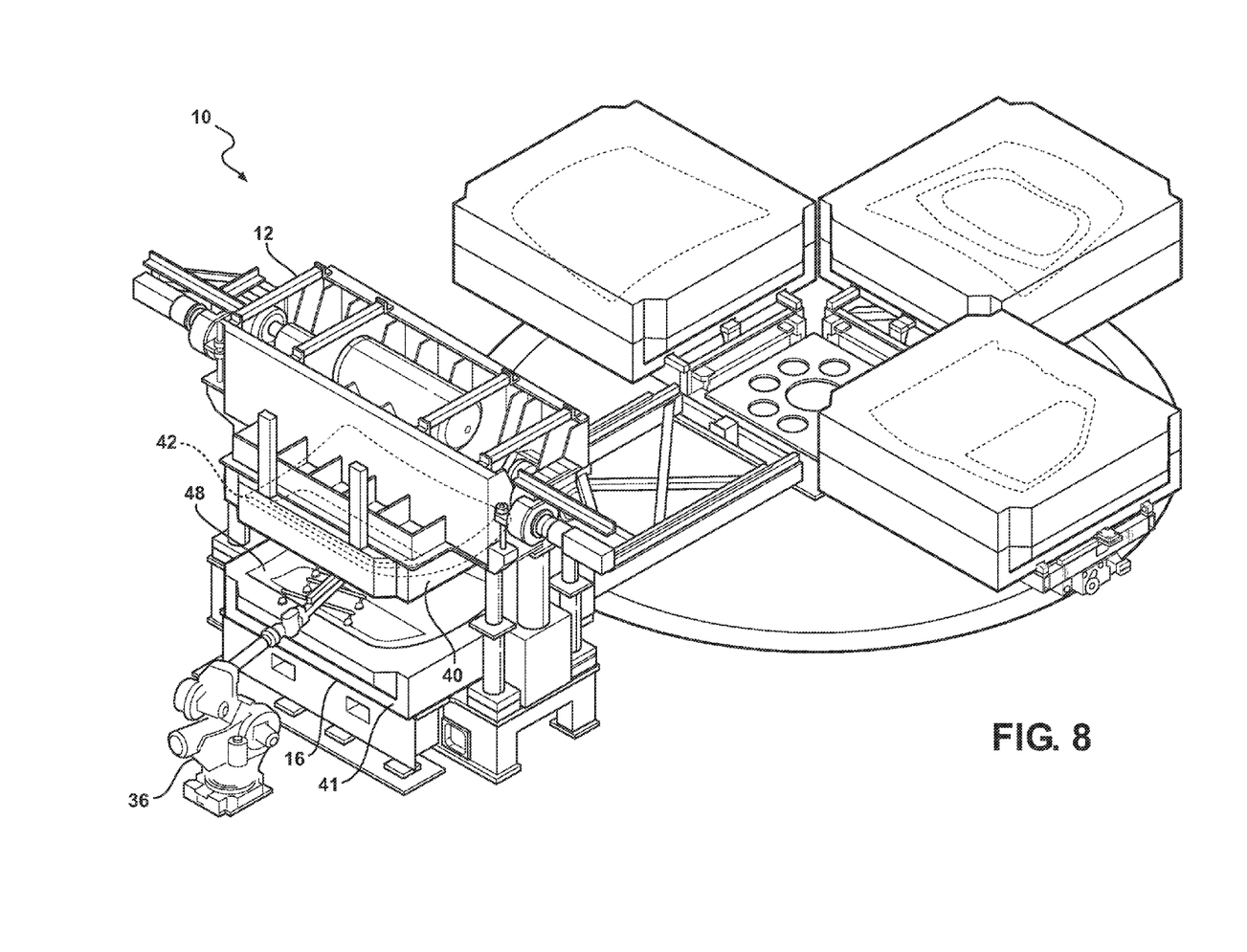
FIG. 8 is a schematic view illustrating loading/unloading of parts into/out of the second die.
Figure 9:
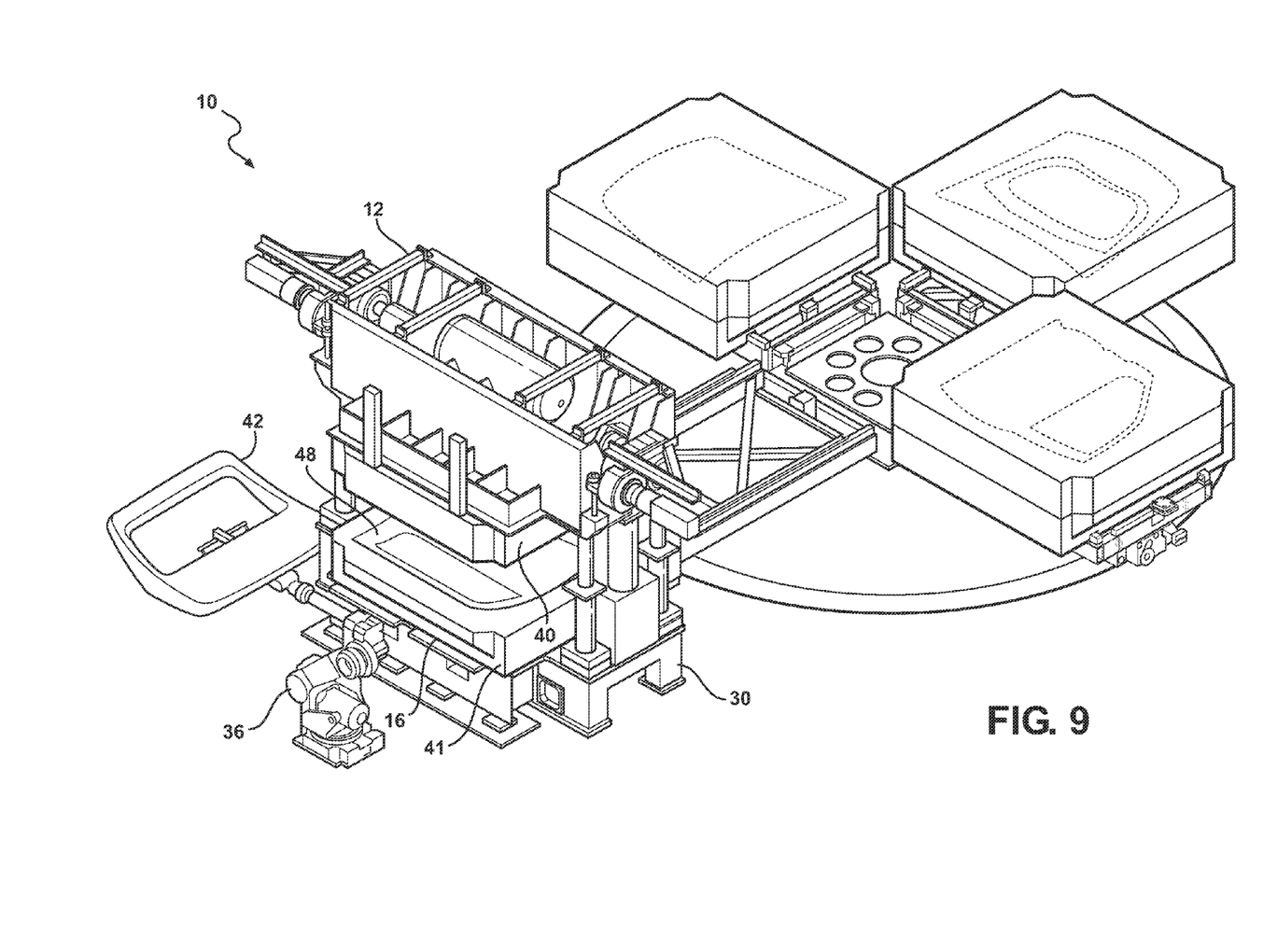
FIG. 9 is a schematic view illustrating a robotic arm moving a hemmed part away from the press.

The die press 12 then moves into a fully open position as shown in FIG. 7. The upper member 40 of the second die set 16 is held by the ram 26, and the lower member 41 of the second die set 16 rests on the base 30 of the die press 12. Next, the robot 36 begins exchange of parts into and out of the die press 12. As shown in FIGS. 8 and 9, when the die press 12 is at the open position, a hemmed part assembly 42 (i.e., finished workpiece) such as a hemmed vehicle liftgate panel is held in the upper member 40 of the second die set 16. The robot 36 then moves a married assembly 48 such as nested inner and outer vehicle liftgate panels into the die press 12 and onto the lower member 41 of the second die set 16. After the robot 36 releases the married assembly 48 onto the lower member 41, the robot 36 picks the hemmed part assembly 42 from the upper member 40 of the second die set 16 and removes the hemmed part 42 from the die press 12. The robot 36 may then move the hemmed part 42 away from the die press 12 to another location such as onto a storage rack or similar. The robot 36 is then available to grab another married, nested panel assembly while the die press 12 proceeds to perform a hemming operation on the married, nested panel assembly that was just inserted into the die press 12. The die press may repeat these steps to hem workpieces with the second die set 16. When it is necessary to change the die, another die change operation as described above can be performed.

The rotary die changer 34 is shown with four die sets. The present method can be executed with more or fewer die sets, and with other die changer configurations other than a rotary configuration.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A die change method comprising the steps of:
providing a press apparatus having a base and a ram, and a first die set including an upper die member and a lower die member;
supporting said lower die member on said base and mounting said upper die member on said ram;
lowering said ram into a closed, home position to mate said upper and lower die members and to perform an operation on a workpiece disposed between said die members;
releasing said ram from said upper die member;
raising said ram a minimum distance to provide minimal clearance for removing said upper and lower die members from said press; and
moving said mated upper and lower die members out of said press with said workpiece held between said upper and lower die members.

2. The method of claim 1, including the steps of:
moving a second die set including an upper die member and a lower die member into said press such that said second lower die member is supported by said base;
lowering said ram into said closed, home position such that said ram contacts said second upper die member; and
mounting said second upper die member on said ram.

3. The method of claim 1, wherein said minimal clearance is generally 200 mm.

4. The method of claim 1, including storing one finished workpiece per die set on a die changer.

5. The method of claim 1, providing a die changer having a plurality of locations for storing die;
rotating said die changer such that an empty die storing location is aligned with said press;
moving said first die set out of said press and into said empty die storing location;
rotating said die changer such that a second die set located in one of said die storing locations is aligned with said press; and
moving said second die set into said press.

6. The method of claim 5, wherein said die changer is a rotary die changer.

7. The method of claim 5, wherein each die set disposed in said die changer stores one finished workpiece.

8. The method of claim 2, including the steps of:
raising said ram from said closed, home position into an open position wherein said second upper die member is spaced from said second lower die member a distance greater than said minimum distance;
inserting another workpiece into said press, said another workpiece being placed on said second lower die member;
removing a finished workpiece from said second upper die member; and
lowering said ram into said closed, home position to mate said second upper and lower die members and to perform an operation on said another workpiece disposed between said die members.

9. The method of claim 8, wherein a robotic arm manipulates workpieces into and out of said press.

10. The method of claim 1, wherein said workpiece is a set of nested panels.

11. The method of claim 1, wherein said operation performed on said workpiece is a hemming operation.

* * * * *